(12) United States Patent
El-Jamous et al.

(10) Patent No.: US 11,856,524 B2
(45) Date of Patent: Dec. 26, 2023

(54) SYSTEMS AND METHODS FOR DEEP REINFORCEMENT LEARNING FOR OPTIMAL POWER CONTROL IN WIRELESS NETWORKS

(71) Applicant: INTELLIGENT AUTOMATION, LLC, Rockville, MD (US)

(72) Inventors: Ziad El-Jamous, Rockville, MD (US); Yalin Evren Sagduyu, Gaithersburg, MD (US); Kemal Davaslioglu, Ellicott City, MD (US)

(73) Assignee: INTELLIGENT AUTOMATION, LLC, Rockville, MD (US)

( * ) Notice: Subject to any disclaimer, the term of this patent is extended or adjusted under 35 U.S.C. 154(b) by 32 days.

(21) Appl. No.: 17/544,649

(22) Filed: Dec. 7, 2021

(65) Prior Publication Data

US 2023/0180138 A1    Jun. 8, 2023

(51) Int. Cl.
*H04W 52/22* (2009.01)
*H04W 52/06* (2009.01)

(52) U.S. Cl.
CPC ......... *H04W 52/223* (2013.01); *H04W 52/06* (2013.01)

(58) Field of Classification Search
CPC . H04W 52/223; H04W 52/06; H04W 52/228; H04W 52/0219; H04W 52/241; H04W 52/18; H04W 52/04; H04W 52/245; H04W 52/02; H04W 52/0258; H04W 52/0245; H04W 52/265; H04W 52/0209; H04W 52/0277; H04W 52/24; H04W 52/383; H04W 72/542; H04W 24/02; H04W 4/40; H04W 92/18; Y02D 30/70; H04B 1/38; H04B 17/309; H04B 17/318; H04B 17/24; G06N 20/00; G06N 3/08; G06N 3/047; G06N 5/025; G06N 7/01; H04L 41/16; H04L 1/0026; H04L 2012/2841
See application file for complete search history.

(56) References Cited

U.S. PATENT DOCUMENTS

| 2012/0129564 A1* | 5/2012 | De Chanterac ....... H04W 52/04 455/522 |
| 2012/0218926 A1* | 8/2012 | Wang ................ H04W 52/0219 455/522 |
| 2022/0038902 A1* | 2/2022 | Mueck .................. H04B 17/24 |

(Continued)

OTHER PUBLICATIONS

Iwlist(8)—Linux man page, https://web.archive.org/web/20210801160715/https:/linux.die.net/man/8/iwlist, last accessed Mar. 8, 2022, internet.

(Continued)

*Primary Examiner* — Lana N Le
(74) *Attorney, Agent, or Firm* — Amster, Rothstein & Ebenstein LLP

(57) ABSTRACT

Wireless networks with plural nodes having a respective transceiver and a processor configured to, and methods to, obtain current state data, calculate a reward, store such state data and rewards in a collected parameters database, provide such current state data and data from such collected parameters database to a reinforced neural network, select an action using the reinforced neural network, and output the action to the respective transceiver so as to selective modify its transmit power level.

33 Claims, 5 Drawing Sheets

(56) References Cited

U.S. PATENT DOCUMENTS

| | | | | |
|---|---|---|---|---|
| 2022/0100254 A1* | 3/2022 | Szurtei | ............... | G06N 3/08 |
| 2022/0123797 A1* | 4/2022 | Files | ............... | H04B 17/309 |
| 2023/0107539 A1* | 4/2023 | Wu | ............... | H04L 41/16 |
| | | | | 370/235 |

OTHER PUBLICATIONS

Iwconfig(8)—Linux man page, https://web.archive.org/web/20210225114056/https:/linux.die.net/man/8/iwconfig, last accessed Mar. 8, 2022, internet.

O. Simeone, "A Very Brief Introduction to Machine Learning With Applications to Communication Systems," in IEEE Transactions on Cognitive Communications and Networking, vol. 4, No. 4, pp. 648-664, Dec. 2018.

T. Erpek, T. O'Shea, Y. E. Sagduyu, Y. Shi, and T. C. Clancy, "Deep Learning for Wireless Communications," Development and Analysis of Deep Learning Architectures, Springer, 2020.

Feriani and E. Hossain, "Single and Multi-Agent Deep Reinforcement Learning for AI-Enabled Wireless Networks: A Tutorial," IEEE Communications Surveys & Tutorials, vol. 23, No. 2, pp. 1226-1252, Second quarter 2021.

Z. Xu, Y. Wang, J. Tang, J. Wang, and M. C. Gursoy, "A deep reinforcement learning based framework for power-efficient resource allocation in cloud RANs," IEEE International Conference on Communications (ICC), Paris, France, May 2017.

S. Wang, H. Liu, P. H. Gomes and B. Krishnamachari, "Deep Reinforcement Learning for Dynamic Multichannel Access in Wireless Network," IEEE Transactions on Cognitive Communications and Networking, vol. 4, No. 2, pp. 257-265, Jun. 2018.

O. Naparstek and K. Cohen, "Deep Multi-User Reinforcement Learning for Distributed Dynamic Spectrum Access," IEEE Transactions on Wireless Communications, vol. 18, No. 1, pp. 310-323, Jan. 2019.

Y. Yu, T. Wang and S. C. Liew, "Deep-Reinforcement Learning Multiple Access for Heterogeneous Wireless Networks," IEEE Journal on Selected Areas in Communications, vol. 37, No. 6, pp. 1277-1290, Jun. 2019.

Y. Yu, S. C. Liew and T. Wang, "Carrier-Sense Multiple Access for Heterogeneous Wireless Networks Using Deep Reinforcement Learning," IEEE Wireless Communications and Networking Conference Workshop (WCNCW), 2019.

R. Ali, N. Shahin, Y. B. Zikria, B. Kim and S. W. Kim, "Deep Reinforcement Learning Paradigm for Performance Optimization of Channel Observation-Based MAC Protocols in Dense WLANs," IEEE Access, vol. 7, pp. 3500-3511, 2019.

N. Abu Zainab, T. Erpek, K. Davaslioglu, Y. E. Sagduyu, Y. Shi, S. Mackey, M. Patel, F. Panettieri, M. Qureshi, V. Isler, A. Yener, "QoS and Jamming-Aware Wireless Networking Using Deep Reinforcement Learning," IEEE Military Communications Conference (MILCOM), 2019.

X. Li, J. Fang, W. Cheng, H. Duan, Z. Chen and H. Li, "Intelligent Power Control for Spectrum Sharing in Cognitive Radios: A Deep Reinforcement Learning Approach," IEEE Access, vol. 6, pp. 25463-25473, 2018.

Y. S. Nasir and D. Guo, "Multi-Agent Deep Reinforcement Learning for Dynamic Power Allocation in Wireless Networks," IEEE Journal on Selected Areas in Communications, vol. 37, No. 10, pp. 2239-2250, Oct. 2019.

M. K. Sharma, A. Zappone, M. Assaad, M. Debbah and S. Vassilaras, "Distributed Power Control for Large Energy Harvesting Networks: A Multi-Agent Deep Reinforcement Learning Approach," IEEE Transactions on Cognitive Communications and Networking, vol. 5, No. 4, pp. 1140-1154, Dec. 2019.

Z. Lu and M. C. Gursoy, "Dynamic Channel Access and Power Control via Deep Reinforcement Learning," IEEE Vehicular Technology Conference (VTC2019-Fall), 2019.

H. Zhang, N. Yang, W. Huangfu, K. Long and V. C. M. Leung, "Power Control Based on Deep Reinforcement Learning for Spectrum Sharing," IEEE Transactions on Wireless Communications, vol. 19, No. 6, pp. 4209 4219, Jun. 2020.

F. B. Mismar, B. L. Evans and A. Alkhateeb, "Deep Reinforcement Learning for 5G Networks: Joint Beamforming, Power Control, and Interference Coordination," IEEE Transactions on Communications, vol. 68, No. 3, pp. 1581-1592, Mar. 2020.

E. Khorov, I. Levitsky and I. F. Akyildiz, "Current Status and Directions of IEEE 802.11be, the Future Wi-Fi 7," IEEE Access, vol. 8, pp. 88664-88688, 2020.

K. Davaslioglu, S. Soltani, T. Erpek and Y. E. Sagduyu, "DeepWiFi: Cognitive WiFi with Deep Learning," IEEE Transactions on Mobile Computing, vol. 20, No. 2, pp. 429-444, Feb. 2021.

J. Tan, L. Zhang, Y. -C. Liang and D. Niyato, "Intelligent Sharing for LTE and WiFi Systems in Unlicensed Bands: A Deep Reinforcement Learning Approach," IEEE Transactions on Communications, vol. 68, No. 5, pp. 2793-2808, May 2020.

Y. E. Sagduyu, S. Soltani, T. Erpek, Y. Shi and J. Li, "A unified solution to cognitive radio programming, test and evaluation for tactical communications," IEEE Communications Magazine, Oct. 2017.

J. Yackoski, B. Azimi-Sadjadi, A. Namazi, J. H. Li, Y. E. Sagduyu, and R. Levy, "RF-NEST: Radio Frequency Network Emulator Simulator Tool," IEEE Military Communications Conference (MILCOM), 2011.

The Babel Routing Protocol, https://datatracker.ietf.org/doc/html/rfc8966.

V. Mnih, K. Kavukcuoglu, D. Silver, A. Graves, I. Antonoglou, D. Wierstra, and Martin Riedmiller, "Playing Atari with Deep Reinforcement Learning," NeurIPS Deep Learning Workshop, 2013.

V. Mnih et al., "Human-level control through deep reinforcement learning," Nature, vol. 518, pp. 529-533, 2015.

* cited by examiner

| Node ID | Timestamp | Feature 1 | Feature 2 | Feature 3 | Action | Energy Efficiency | Next Feature 1 | Next Feature 2 | Next Feature 3 | Done | P constant |
|---|---|---|---|---|---|---|---|---|---|---|---|
| 1 | 1636066866 | 53 | -57 | 10 | 2 | 1.792 | 52 | -58 | 11 | 0 | 0.1 |
| 1 | 1636066872 | 52 | -58 | 11 | 1 | 1.802 | 50 | -60 | 11 | 0 | 0.1 |
| 1 | 1636066878 | 50 | -60 | 11 | 2 | 3.011 | 52 | -58 | 12 | 0 | 0.1 |
| 1 | 1636066883 | 52 | -58 | 12 | 0 | 2.772 | 51 | -59 | 11 | 0 | 0.1 |
| 1 | 1636066888 | 51 | -59 | 11 | 0 | 3.005 | 50 | -60 | 10 | 1 | 0.1 |
| ... | ... | ... | ... | ... | ... | ... | ... | ... | ... | ... | ... |
| 2 | 1636066928 | 51 | -59 | 15 | 0 | 2.948 | 49 | -61 | 14 | 0 | 0.1 |
| 2 | 1636066933 | 49 | -61 | 14 | 0 | 3.211 | 50 | -60 | 13 | 0 | 0.1 |
| 2 | 1636066939 | 50 | -60 | 13 | 0 | 2.989 | 51 | -59 | 12 | 0 | 0.1 |
| 2 | 1636066944 | 51 | -59 | 12 | 1 | 2.948 | 49 | -61 | 12 | 0 | 0.1 |
| 2 | 1636066950 | 49 | -61 | 12 | 2 | 3.211 | 55 | -55 | 13 | 1 | 0.1 |
| ... | ... | ... | ... | ... | ... | ... | ... | ... | ... | ... | ... |
| 3 | 1636066978 | 53 | -57 | 4 | 2 | 1.744 | 49 | -61 | 5 | 0 | 0.1 |
| 3 | 1636066984 | 49 | -61 | 5 | 2 | 3.305 | 47 | -63 | 6 | 0 | 0.1 |
| 3 | 1636066990 | 47 | -63 | 6 | 1 | 3.082 | 48 | -62 | 6 | 0 | 0.1 |
| 3 | 1636066995 | 48 | -62 | 6 | 0 | 3.311 | 46 | -64 | 5 | 0 | 0.1 |
| 3 | 1636067000 | 46 | -64 | 5 | 0 | 2.33 | 47 | -63 | 4 | 1 | 0.1 |
| ... | ... | ... | ... | ... | ... | ... | ... | ... | ... | ... | ... |
| N | 1636067005 | 53 | -57 | 18 | 2 | 1.699 | 52 | -58 | 19 | 0 | 0.1 |
| N | 1636067700 | 52 | -58 | 19 | 2 | 1.692 | 54 | -56 | 20 | 0 | 0.1 |
| N | 1636067706 | 54 | -56 | 20 | 1 | 0.931 | 51 | -59 | 20 | 0 | 0.1 |
| N | 1636067711 | 51 | -59 | 20 | 0 | 2.862 | 55 | -55 | 19 | 0 | 0.1 |
| N | 1636067716 | 55 | -55 | 19 | 1 | 0.942 | 52 | -58 | 19 | 1 | 0.1 |
| ... | ... | ... | ... | ... | ... | ... | ... | ... | ... | ... | ... |

FIG. 4

$$Q = \begin{bmatrix} r_{11} & \cdots & r_{13} \\ \vdots & \ddots & \vdots \\ r_{N1} & \cdots & r_{N3} \end{bmatrix}$$

Action 1 ↓    Action 3 ↓    ← State 1    ← State N

FIG. 5

SYSTEMS AND METHODS FOR DEEP REINFORCEMENT LEARNING FOR OPTIMAL POWER CONTROL IN WIRELESS NETWORKS

This invention was made with government support under contract number W91RUS-21-C-0006 awarded by the United States Army. The government may have certain rights in this invention.

FIELD OF THE INVENTION

This invention generally relates to the field of power control in wireless network communications.

BACKGROUND

One technical problem that arises in wireless network communications is balancing power consumption and transmission or throughput of data in the system. In conventional wireless network communication systems, prior approaches have been focused on heuristics-based optimization approaches and linear programming. These approaches, however, use detailed a posteriori models of the network environment, for example relating to its topology, and are constructed to account for the high apparent degree of complexity of a distributed network environment. Moreover, these are not fully distributed approaches, and do not provide for training or adaptability based on the actual network environment. These approaches also fail to take into account total power consumption.

The requirement for a posteriori models of the network environment increases the amount of time and effort required for these approaches, and inaccuracies in the models can moreover affect the reliability of the results. Moreover, the lack of distribution, lack of training and environmental adaptability of these approaches, and failure to consider the constancy of power consumption, result in high complexity of the solution, poor efficiency, and a solution that is a poor fit with an actual and often ever-changing network environment. Accordingly, it would be beneficial to provide a wireless network communication system that avoids these problems.

SUMMARY OF INVENTION

In view of the above, it is the object of the present disclosure to provide systems and methods to overcome the technological challenges faced in conventional approaches to optimizing a balance between energy consumption and throughput in a wireless network environment. In embodiments, adaptably-applied reinforcement-based machine learning may be used, which eliminates the need for a posteriori models, and may provide better results than heuristic and/or linear programming approaches used in conventional systems. Advantageously, according to exemplary embodiments of the present invention, a balance between throughput and energy consumption of wireless communication networks may be improved which may advantageously prolong network lifetime while simultaneously accommodating a need for high throughput. Further advantageously, according to exemplary embodiments of the present invention, edge devices in the network, which may have a critical need for operation at limited power (e.g. as a result of being battery-powered) may have power levels adaptably set in a manner that takes into consideration the balance between throughput and energy consumption.

In particular, according to exemplary embodiments of the present invention, reinforcement learning, such as through a deep neural network or deep reinforcement learning agent (either of which may be implemented using the processor 102 in conjunction with associated memory), may be employed in order to make use of observations regarding transceivers in a wireless network and, based thereon, to dynamically adjust transmit power levels to these transceivers.

In exemplary embodiments of the present invention, which are discussed in more detail in the below detailed description of the invention, a wireless network may be made up of a plurality of nodes, each of which having a respective communication-configured transceiver and a respective processor. According to exemplary embodiments of the present invention, such wireless networks, for example through the respective processor of each of the nodes, may be configured to perform methods in which data is gathered regarding the transceiver and reinforcement learning is performed, for example, by a way of a reinforced neural network or a reinforcement learning engine, to selectively adjust transmit power levels associated with the respective transceiver, thereby creating a balance between throughput and energy consumption.

In an exemplary embodiment, a wireless network includes a plurality of nodes, each respective node including a respective transceiver having a respective transmit power level and configured to communicate, and a respective processor configured to: (1) obtain, as current state data, a time t1, the respective transmit power level at the time t1 of the respective transceiver, a respective link quality at the time t1 associated with the respective transceiver, and a respective signal strength at the time t1 associated with the respective transceiver, (2) calculate, as a reward, a measure pertaining to energy efficiency at the time t1 based at least on (i) a throughput at the time t1 based at least on the respective link quality at the time t1 of the respective transceiver and the respective signal strength at the time t1 associated with the respective transceiver, and (ii) an amount of energy consumption at the time t1 based at least on the respective transmit power level at the time t1 associated with the respective transceiver, (3) store, in a memory associated with the processor, in a collected parameters database: (i) the current state data, (ii) an identification of the respective node, (iii) the reward, and (iv) previously obtained state data, from a time t0 previous to the time t1, comprising a respective transmit power level at the time t0 of the respective transceiver, a respective link quality at the time t0 associated with the respective transceiver, and a respective signal strength at the time t0 associated with the respective transceiver, (4) provide the current state data, and data from the collected parameters database to a reinforced neural network, (5) select an action, using the reinforced neural network, from amongst a set of possible actions relating to the transmit power level of the respective transceiver, based at least on the current state data and the data from the collected parameters database, and (6) output the selected action, such that the respective transmit power level of the respective transceiver of the associated node is selectively modified in accordance with the selected action.

In exemplary embodiments, the calculation of the reward may further be based on a change between the respective transmit power level at the time t1 associated with the respective transceiver and the respective transmit power level at the time t0 associated with the respective transceiver, such that the reward decreases as the change increases.

In embodiments, the calculation of the reward as applied at a time t, may be calculated according to the equation $$r_n(t) = \frac{T_n(t)}{E_n(t)} - c \cdot \Delta P_n(t),$$

where $r_n(t)$ is a reward associated with a node n at the time t, $P_n(t)$ is a transmit power level of the node n at the time t, $T_n(t)$ is a throughput received by the node n at the time t as determined based at least on a link quality associated with a transceiver of the node n and a signal strength associated with the transceiver of the node n, $E_n(t)$ is the total energy consumption that corresponds to one time increment and is based at least on a transmit power of the node n, and c is a positive constant.

In embodiments, $E_n(t)$ may be normalized with respect to a packet duration.

In exemplary embodiments, the respective transceiver of each respective node of the node of the plurality of nodes may be configured to communicate with at least one other transceiver of at least one other node respective node of the plurality of nodes In exemplary embodiments, the respective transceiver of each respective node of the plurality of nodes may be configured to communicate with a central server.

In exemplary embodiments, the reinforced neural network may be a deep neural network.

In exemplary embodiments, the reinforced neural network may be a multi-layer feed forward neural network.

In exemplary embodiments, the multi-layer feed forward neural network may include an input layer, at least one hidden layer, and an output layer.

In exemplary embodiments, the input layer may take the current state data as an input, and the output layer may have a set of neurons corresponding to the set of possible actions.

In exemplary embodiments, the at least one hidden layer may be configured to embody an activation function.

In exemplary embodiments, the activation function may be a rectifying linear unity (ReLU) activation function, a leaky rectifying linear unit (Leaky-ReLU) activation function, a hyperbolic tangent (Tanh) activation function, a sigmoid activation function, a logistic activation function, a scaled exponential linear units (SELU) activation function, a Gaussian error linear unit (GeLU) activation function, an exponential linear unit (ELU) activation function, a parametric rectified linear unit (PReLU) activation function, or a sigmoid linear unit (SiLU) activation function.

In exemplary embodiments, the multi-layer feed forward neural network may be further configured to be trained by minimizing a mean squared error loss function.

In exemplary embodiments, the respective processor of one or more or each respective node of the plurality of nodes may be further configured to implement a routing protocol for communications involving the respective transceiver.

In exemplary embodiments, the respective processor of one or more or each respective node of the plurality of nodes may be configured to control a wireless adapter of the respective transceiver or wireless front-end of the respective transceiver.

In exemplary embodiments, the respective transceiver of one or more or each respective node of the plurality of nodes operates in at least one of a 900 MHz band, a 2.4 GHz band, a 5 GHz band, or a 6 GHz band.

In exemplary embodiments, the plurality of nodes may include two nodes.

In exemplary embodiments, the plurality of nodes may include at least three nodes.

In exemplary embodiments, the respective transceivers of three or more nodes of the plurality of nodes may be configured to communicate amongst themselves in a multi-hop fashion.

In exemplary embodiments, the respective transceivers of two or more nodes of the plurality of nodes may be configured to communicate amongst themselves directly.

In exemplary embodiments, the respective transceiver of at least one respective node, or each respective node, of the plurality of nodes may be a WiFi transceiver.

In exemplary embodiments, the respective transceiver of at least one respective node, or each respective node, of the plurality of nodes may be a WiFi 6 transceiver, a WiFi 6E transceiver, a Wifi HaLow transceiver, a Bluetooth transceiver, a Bluetooth Low Energy transceiver, a ZigBee transceiver, a Z-Wave transceiver, or a Long Range Wide Area Network transceiver.

In exemplary embodiments, the respective transceiver of at least one respective node or each respective node of the plurality of nodes may be configured to operate according to at least one of a 802.11n specification, a 802.11b specification, a 802.11g specification, a 802.11ac specification, a 802.11ah specification, a 802.11ax specification, a 802.11ax-2021 specification, a 802.15.4 specification, and a Long Range (LoRa) specification.

In exemplary embodiments, the link quality may be based on at least one of a level of contention, a level of interference, a bit error rate, a frame error rate, a timing synchronization, and a hardware metric.

In exemplary embodiments, the link quality may be based on an indication of a Link Quality Indicator (LQI).

In exemplary embodiments, the signal strength may be based on an indication of a Received Signal Strength Indicator (RSSI).

In exemplary embodiments, the signal strength may be measured in arbitrary units.

In exemplary embodiments, the signal strength may be measured in dBm.

In exemplary embodiments, the respective processor may be configured to obtain the respective transmit power level at the time t1 of the respective transceiver, obtain the respective link quality at the time t1 associated with the respective transceiver, and obtain the respective signal strength at the time t1 associated with the respective transceiver, by executing one or more drivers stored in the memory associated with the respective processor.

In exemplary embodiments, the set of possible actions relating to the transmit power level of the respective transceiver includes raising the respective transmit power level of the respective transceiver, lowering the respective transmit power level of the respective transceiver, and maintaining the transmit power level of the respective transceiver.

In exemplary embodiments, the set of possible actions relating to the transmit power level of the respective transceiver may include setting the transmit power level of the respective transceiver to a particular set value from amongst a plurality of possible set values.

In exemplary embodiments, the plurality of possible set values may be dBm amounts corresponding to the 21 integers between 0 and 20 inclusive.

In exemplary embodiments, a wireless network includes a plurality of nodes, each respective node including a respective transceiver having a respective transmit power level and configured to communicate, and a respective processor configured to (1) obtain, as current state data, a time t1, the respective transmit power level at the time t1 of the respective transceiver, a respective link quality at the time t1 associated with the respective transceiver, and a respective signal strength at the time t1 associated with the respective transceiver, (2) calculate, as a reward, a measure pertaining to energy efficiency at the time t1 based at least on (i) a throughput at the time t1 based at least on the respective link quality at the time t1 of the respective transceiver and the respective signal strength at the time t1 associated with the respective transceiver, and (ii) an amount of energy consumption at the time t1 based at least on the respective transmit power level at the time t1 associated with the respective transceiver, (3) store the reward, in a Q-table matrix in memory associated with the processor, in a location within the Q-table matrix based at least on (i) the current state data, (ii) an identification of the respective node, and (iii) previously obtained state data, from a time t0 previous to the time t1, comprising a respective transmit power level at the time t0 of the respective transceiver, a respective link quality at the time t0 associated with the respective transceiver, and a respective signal strength at the time t0 associated with the respective transceiver, (4) provide the current state data, and data from the Q-table matrix to a reinforcement learning engine; (5) select an action, using the reinforcement learning engine, from amongst a set of possible actions relating to the transmit power level of the respective transceiver, based at least on the current state data and the data from the Q-table matrix, and (6) output the selected action, such that the respective transmit power level of the respective transceiver of the associated node is selectively modified in accordance with the selected action.

In exemplary embodiments, a method for balancing energy efficiency and throughput in a wireless network having a plurality of nodes having a respective transceiver, includes steps of: (1) obtaining, as current state data, a time t1, a respective transmit power level at the time t1 of a respective transceiver of a node from amongst the plurality of nodes, a respective link quality at the time t1 associated with the respective transceiver, and a respective signal strength at the time t1 associated with the respective transceiver; (2) calculating, as a reward, a measure pertaining to energy efficiency at the time t1 based at least on (i) a throughput at the time t1 based at least on the respective link quality at the time t1 of the respective transceiver and the respective signal strength at the time t1 associated with the respective transceiver, and (ii) an amount of energy consumption at the time t1 based at least on the respective transmit power level at the time t1 associated with the respective transceiver; (3) storing in a collected parameters database: (i) the current state data, (ii) an identification of the respective node, (iii) the reward, and (iv) previously obtained state data, from a time t0 previous to the time t1, comprising a respective transmit power level at the time t0 of the respective transceiver, a respective link quality at the time t0 associated with the respective transceiver, and a respective signal strength at the time t0 associated with the respective transceiver; (4) providing the current state data, and the collected parameters database to a reinforced neural network; (5) selecting an action, using the reinforced neural network, from amongst a set of possible actions relating to the transmit power level of the respective transceiver, based at least on the current state data and data from the collected parameters database; and (6) outputting the selected action, such that the respective transmit power level of the respec- tive transceiver of the associated node is selectively modified in accordance with the selected action.

BRIEF DESCRIPTION OF THE DRAWINGS

The above and related objects, features and advantages of the present disclosure will be more fully understood by reference to the following detailed description of the preferred, albeit illustrative, exemplary embodiments of the present invention when taken in conjunction with the accompanying figures, wherein:

FIG. 4 shows example collected parameters data (or, in exemplary embodiments, training set data) usable for deep reinforcement learning for power control in network communications in accordance with exemplary embodiments of the present invention.

FIG. 5 shows an example Q-Table matrix in accordance with exemplary embodiments of the present invention.

DETAILED DESCRIPTION OF THE EXEMPLARY EMBODIMENTS

The present invention generally relates to systems and methods for deep reinforcement learning for power control in network communications.

The present invention presents a deep reinforcement learning (DRL) solution for power control in wireless communications, describes an implementation in which a wireless network comprises a plurality of nodes each having a respective processor and transceiver. In exemplary embodiments, the wireless network may be configured for multi-hop communications, although in other exemplary embodiments single-hop communication may be employed.

Figure 1:
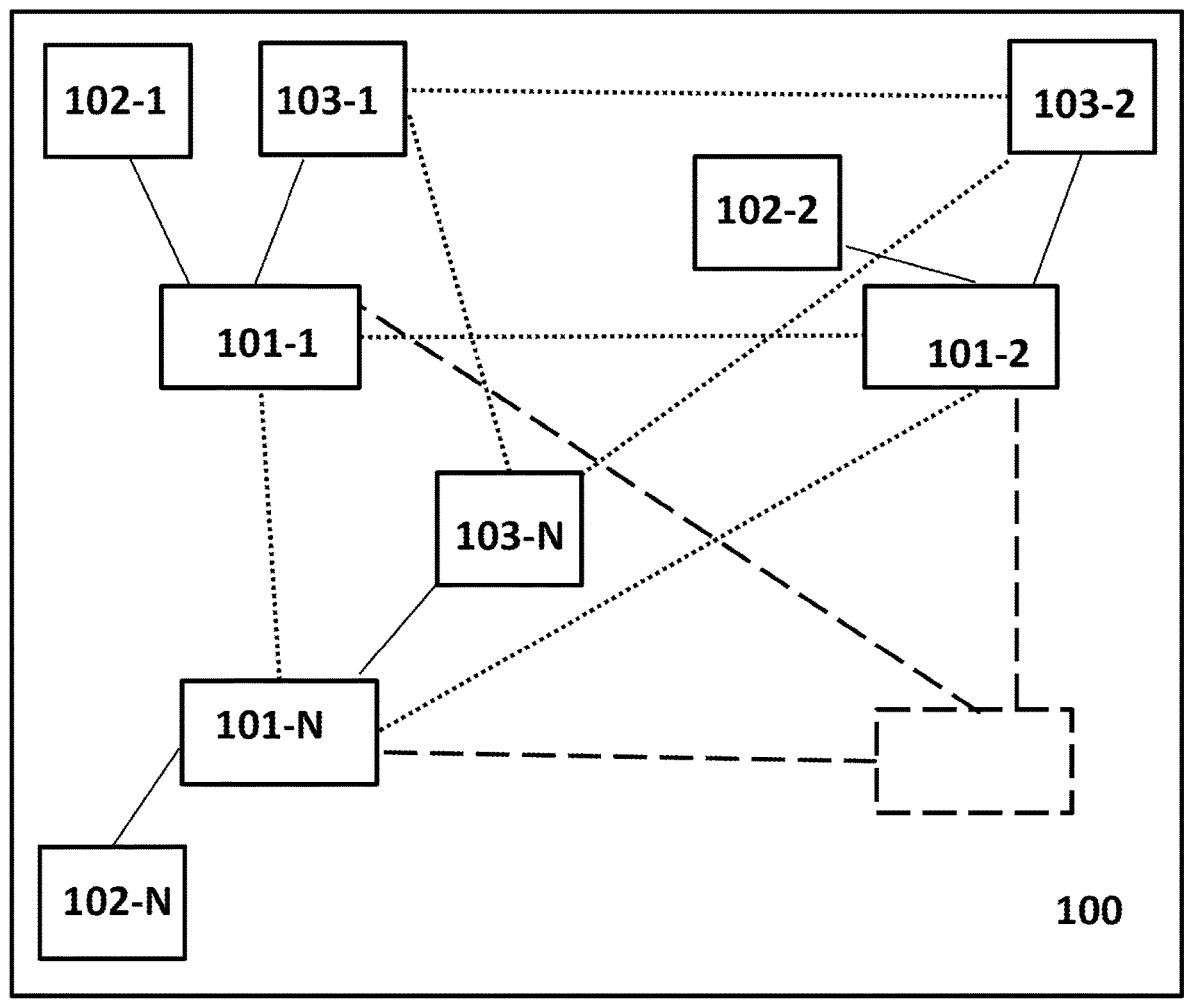
FIG. 1 is a schematic illustration of a system for a plurality of network communications nodes of a wireless network utilizing deep reinforcement learning for power control of respective transceivers in accordance with exemplary embodiments of the present invention.

With reference to FIG. 1, in exemplary embodiments of the present invention, a wireless network 100 may include a plurality of nodes 101-1, 101-2, . . . 101-N. While three such nodes 101 and respective transceivers 103-1, 103-2, . . . 103-N, with dotted lines therebetween are shown in FIG. 1, other nodes and respective transceivers may be included without departing from the spirit of the invention. For example, the dashed box in FIG. 1, in exemplary embodiments, may represent inclusion of one or more additional nodes 101, each of which may have a respective processor 102 and a respective transceiver 103. The dashed lines in FIG. 1, in exemplary embodiments, may represent internode connections with such additional nodes 101. In exemplary embodiments, one node, two nodes, two or more nodes, or three or more nodes may be employed, and one transceiver, two or more transceivers, or three or more transceivers may be employed. Each node 101 may correspond, for example, to a device in the network environment such as a wireless repeater, a smart phone, a desktop or laptop, or a mobile device such as a drone, to name a few. Other devices which are known, or which may be developed, that engage in wireless communication may be used as nodes 101. The nodes 101 as described herein, for example with their respective processors 102-1, 102-2, . . . 102-N and transceivers 103-1, 103-2, . . . 103-N, may make up all of the components or transmitting and/or receiving components of a wireless network 100. However, other components may be included in the wireless network 100.

As shown with dotted lines in FIG. 1, in exemplary embodiments of the present invention, the wireless network 100 may be configured for communication, for example, amongst the respective nodes 101-1, 101-2, . . . 101-N, and/or amongst the respective transceivers 103-1, 103-2, . . . 103-N. The configuration may allow for communication between all of the nodes 101 and/or transceivers 103, or amongst a subset of these nodes 101 and/or transceivers 103. For example, in exemplary embodiments, closely neighboring nodes 101 and/or transceivers 103 in physical space may communicate with each other, while nodes 101 and/or transceivers 103 that are farther away from each other may not communicate with each other.

In exemplary embodiments, additional network topologies may be used for communication between nodes 101 and/or transceivers 103. In exemplary embodiments, nodes 101 and/or transceivers 103 of the wireless network 100 may be connected according to a mesh topology, a cluster-tree mesh topology, a star-mesh topology, a star topology, a tree topology, a line topology, or a ring topology.

Each node 101 may act as one or more or all of the source, the destination, or the relay for network packet traffic. The nodes 101 may, for example, be used in a smart WiFi systems such as in WiFi 7, or in scenarios such as WiFi Internet of Things (IoT) devices connected with WiFi (potentially in a multi-hop network setting such as in smart warehouses, where multiple hops may be needed to reach IoT devices over an extended area) and mesh WiFi networks (for example, Google Nest or Amazon eero).

In exemplary embodiments of the present invention, some or all of the nodes 101 may be associated with a respective processor 102, which may for example be an embedded processor, an ARM processor, or an embedded ARM processor. The processor 102 may have access to a memory, which may be dedicated to the particular processor 102, for example via being embedded in the node 101 or by being allocated at a central server or in a cloud storage arrangement, or which memory may be shared amongst a number of devices such as the various nodes 101, again for example, memory of a central server or in a cloud storage arrangement. Other forms of memory known in the art or hereafter developed may be employed for use by the processor(s) 102.

In exemplary embodiments of the invention, each of the nodes 101 of the plurality of nodes may further be associated with a respective transceiver 103, which may for example be embedded with the respective node 101 and/or with respective processor 102, and which may for example be a WiFi transceiver. Other devices serving the purpose of transmission of information in a wireless network environment, now known or hereafter developed, may be employed for use as a transceiver 103. For example an Alfa AWUS036NHA WiFi transceiver device may be used as the transceiver 103. As other examples, the wireless network transceivers may be Bluetooth transceivers, ZigBee transceivers, WiFi 6 transceivers, Wi-Fi 6E transceivers, Wi-Fi Halow transceivers, Bluetooth Low Energy (BLE) transceivers, Z-Wave transceivers, or Long Range Wide Area Network transceivers, or a combination thereof, to name a few. Transceiver 103 may be configured for communication according to a standard or protocol, now known or hereafter developed such as 802.11 or 802.11n protocols. Other example protocols that may be employed may include 802.11a, 802.11b, 802.11g, 802.11ac, 802.11ah, 802.ax, 802.11ax-2021, 802.15.4 and Long Range (LoRa) protocols, to name a few. The backoff mechanism of CSMA/CA as used in 802.11 protocols may be employed in exemplary embodiments under which temporal correlations in the channel access pattern are correlated. Communication may, in exemplary embodiments, occur at a standard band, such as a 2.4 GHz band. Other bands may be employed, such as a 900 MHz band, a 5 GHz band, or a 6 GHz band, to name a few.

Also, in exemplary embodiments, network mobility may induce temporal correlations in observed spectrum data.

The respective transceiver 103 may be operatively connected to the respective processor 102, for transmission of information and/or instructions therebetween. For example, a direct or indirect USB connection, or other direct or indirect wired or wireless connection, may be employed between the respective processor 102 and transceiver 103. The operative connection may be direct or indirect in one or both directions, for example, with respect to indirect connections, allowing for transmission of information and/or instructions via a relay with other devices such as a central server or cloud environment. The processor 102 of one or more or all of the plurality of nodes 101 may be configured to control a wireless adapter of the respective transceiver 103 or wireless front-end of the respective transceiver 103.

Nodes 101, in exemplary embodiments of the present invention, may further be configured for communication amongst themselves. For example, there may be direct and/or indirect wired and/or wireless communication between respective nodes 101. Such communication may occur using the respective processors 102 and/or respective transceivers 103 of the nodes 101, or otherwise through other direct or indirect communication configurations such as use of a USB or other direct connection or a connection to a central server or a cloud communication system, or through other communication systems now known or hereafter developed. For example, in exemplary embodiments, the respective transceiver 103 of one or more or each node of the plurality of nodes 101 may be configured to communicate with at least one other transceiver 103 of at least one other node of the plurality of nodes 101. In exemplary embodiments, the respective transceiver 103 of one or more or each of the plurality of nodes 101 may be configured to communicate with a central server.

A respective processor 102 and a respective transceiver 103 of a node 101 may exchange between them, information and instructions according to exemplary embodiments of the present invention. For example, according to exemplary embodiments of the present invention, a respective processor 102 may send to a respective transceiver 103 an instruction to adjust the transmit power of the respective transceiver 103, such that the respective transceiver 103 may adjust its transmit power according to the instruction. In exemplary embodiments, the transmit power may range from 0 dBm to 20 dBm. The transceiver 103 may send to the processor 102 indications relevant to its ability to transmit and/or receive data, such as a link quality and signal strength (such as a received signal strength). In exemplary embodiments of the present invention, such sending may occur according to the real protocol stack (which may include, for example, the power control solutions as proposed according to the present invention as well as other network protocols like routing for multi-hop network operations) and/or real packet traffic in use in the applicable network environment, thereby giving a more accurate indication of the applicable state s of the transceiver. Advantageously, use of ARM processors for routing protocol implementation may result in fast operation at edge devices.

The processor 102 may have access to one or more drivers, for example stored on memory associated with the processor 102, which driver or drivers allows for the respective processor 102 of a node 101 to control settings of the respective transceiver 103, such as its transmit power level, and which driver or drivers allows for the respective processor 102 to receive information from the transceiver 103, such as information relating to the transceiver's link quality and signal strength. For example, in exemplary embodiments the iwlist scan command may be employed by the processor 102 in order to obtain such information from the transceiver 103. The iwlist command is a linux tool, an exemplary description of which may is provided by die.net at https://linux.die.net/man/8/iwlist, however any suitable tool or application may be used to obtain this information from the transceiver 103.

The respective processor 102 may provide additional functionality with respect to the respective transceiver 103. For example, in exemplary embodiments of the present invention, the processor 102 may maintain a network protocol stack and/or control traffic generation. One or more drivers may be used in connection with such additional functionality of the processor 102.

In exemplary embodiments of the present invention, each mobile node 101 of the wireless network 100 may adjust the transmit power of its respective transceiver 103 to balance the goals of maximizing the throughput and minimizing the energy consumption. In exemplary embodiments, the indications relevant to the respective transceiver's 103 ability to transmit and/or receive data, such as a link quality and signal strength obtained by the processor 102 from the transceiver 103 may be used for this purpose.

In particular, information such as link quality and signal strength may be used, according to exemplary embodiments of the present invention, in collected parameters data (which, in exemplary embodiments, may be training set data) used in a reinforcement learning approach, for example, a deep reinforcement learning approach. As a model-free solution to power control in a network, reinforcement learning (RL) allows nodes to adapt their actions by observing the states and maximizing their cumulative rewards over a time horizon.

Figure 2:
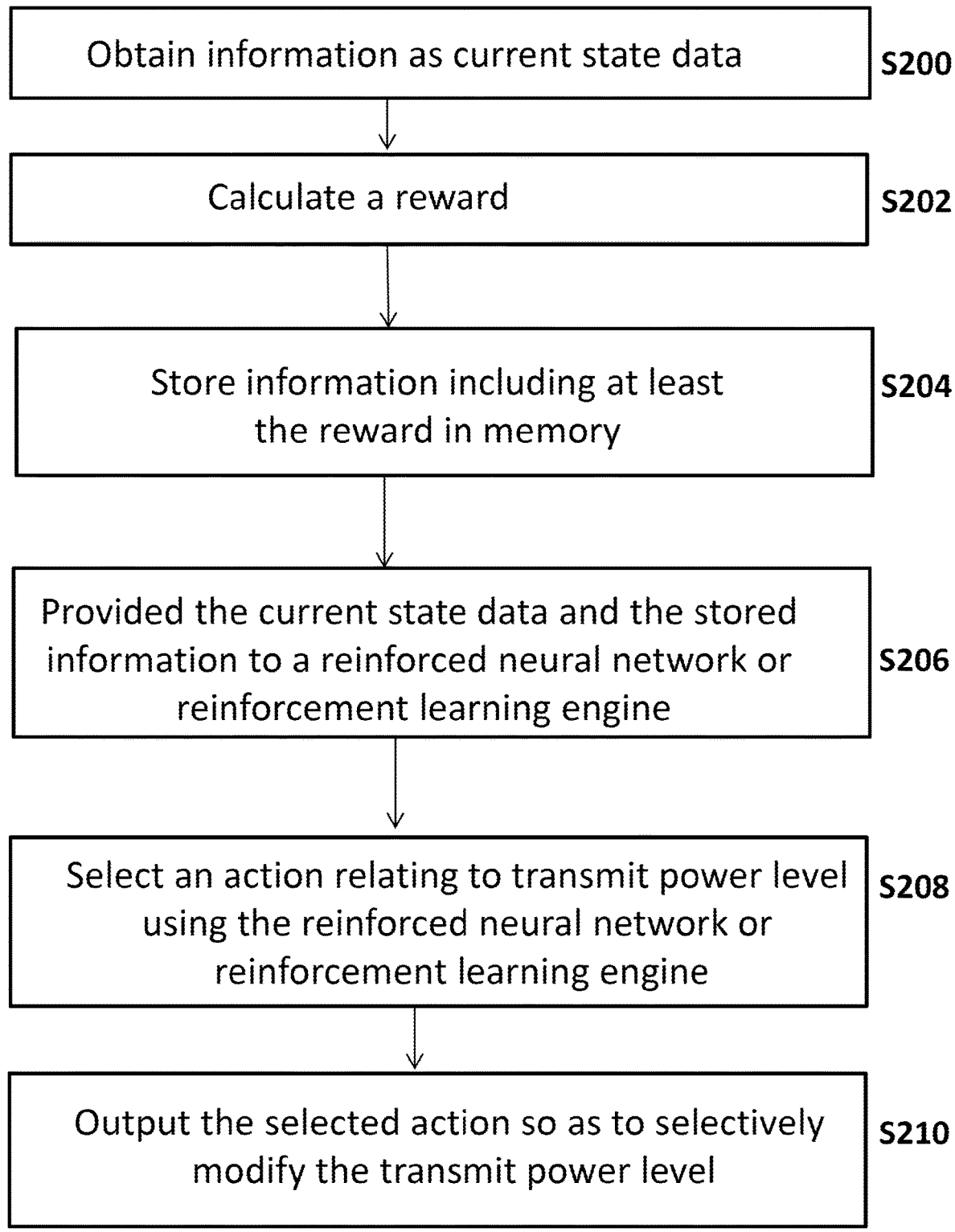
FIG. 2 is a flow chart diagram of a method of deep reinforcement learning for power control in network communications in accordance with exemplary embodiments of the present invention.

FIG. 2 is an exemplary flow chart of a method of deep reinforcement learning for power control in network communications in accordance with an exemplary embodiment of the present invention. Further aspects of exemplary embodiments of the invention may be understood with respect to FIG. 3, which is an exemplary schematic diagram further demonstrating a process flow for a method of deep reinforcement learning for power control in network communications in accordance with exemplary embodiments of the present invention. A DRL approach according to exemplary embodiments of the present invention may be implemented using a deep reinforcement learning agent 301 that is implemented using a neural network. The deep reinforcement learning agent 301 may, for example, be implemented using the processing power of the respective processor 102 as applied to a neural network stored in the memory associated with the respective processor 102. The deep reinforcement learning agent 301 may therefore be associated with each respective node 101 on the wireless network 100.

Figure 3:
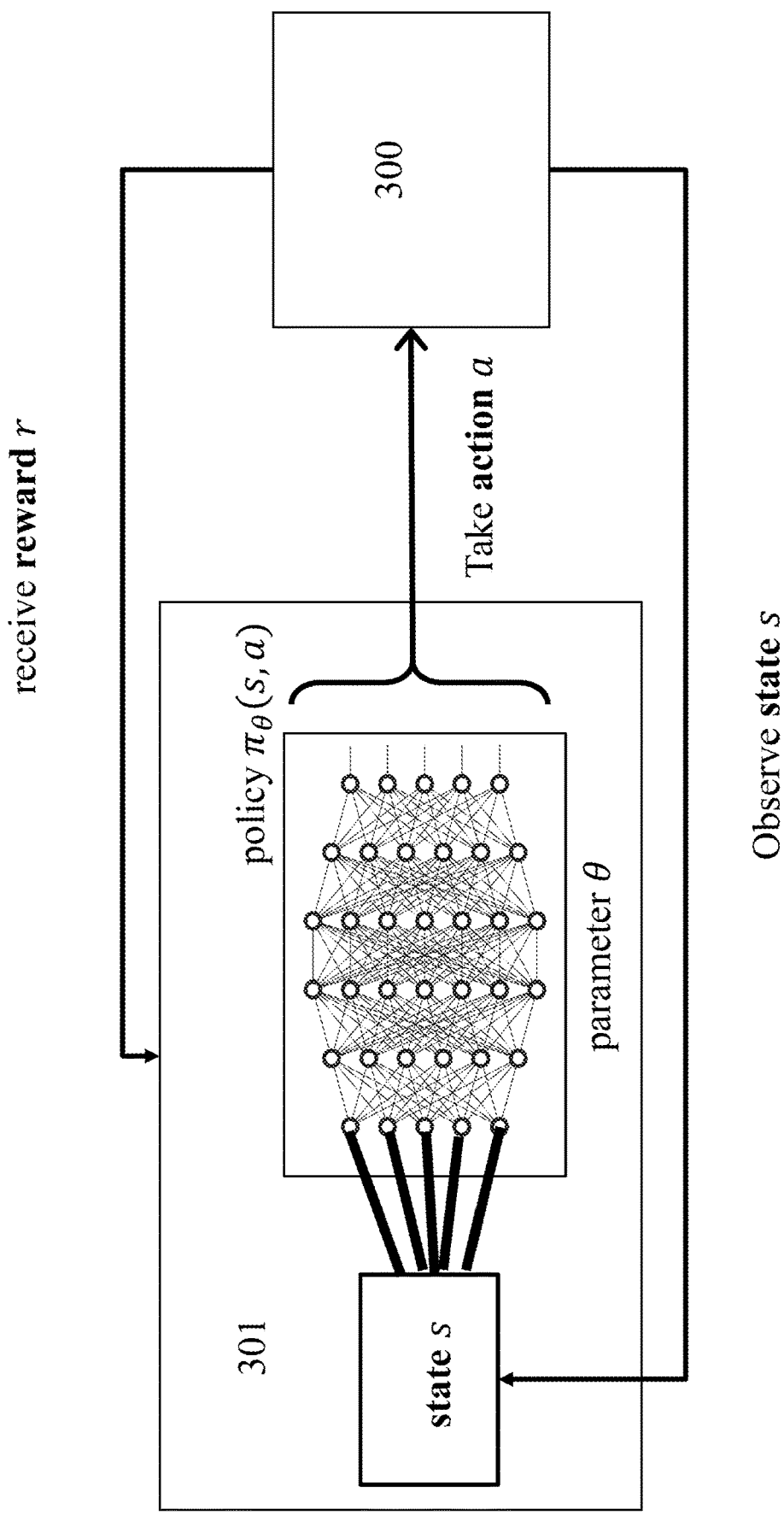
FIG. 3 is a schematic diagram of a process flow for a method of deep reinforcement learning for power control in network communications in accordance with exemplary embodiments of the present invention.

The flow chart of FIG. 2 and the schematic diagram of FIG. 3 illustrate and describe a method that, in exemplary embodiments, may be implemented within the exemplary network environment as shown in FIG. 1. For example, the flow chart of FIG. 2 may be applied in a wireless network 100 with a plurality of nodes 101, each respective node 101 having a respective processor 102 and a respective transceiver 103, which transceiver may have a respective transmit power level and be configured to communicate. One or more or all of the steps S200-S210 shown in the flow chart of FIG. 2 may be performed by way of one or more or each respective processor 102 being configured for such purposes, either directly or through access to one or more drivers stored in memory associated with the processor 102. In an exemplary embodiment, a neural network and/or deep reinforcement learning agent, may be implemented within a single respective processor 102 or within each respective processor 102.

At step S200, one or more or all of the following may be obtained as current state data, for example by the respective processor 102:

a time, which may be referred to as t1, for example based on a contemporaneously obtained timestamp. Such time may be retrieved for example based on a query to the outside environment, or from an internal clock of the respective processor 102, the respective transceiver 103, the respective node 101, or the wireless network 100;

a respective transmit power level at the time t1 of the respective transceiver 103, for example, provided by a driver controlling access to such information from the respective transceiver 103;

a respective link quality at the time t1 associated the respective transceiver 103, for example, provided by the same or a different driver controlling access to the processor 102 of such information from the respective transceiver 103, and/or through a Link Quality Indicator (LQI) associated with the respective transceiver 103; and a respective signal strength at the time t1 associated the respective transceiver 103, for example, provided by the same or a different driver controlling access to the processor 102 of such information from the respective transceiver 103, and/or through a Received Signal Strength Indicator (RSSI) associated with the respective transceiver 103.

According to exemplary embodiments of the invention, the link quality may be an indication of the overall quality of the link associated with respective transceiver 103. For example, the link quality may be based on one or more or all of a level of contention or interference, a bit or framer error rate, a quality of a signal as received by the transceiver 103, a quality of timing synchronization, and a hardware metric. The observed link quality may, in exemplary embodiments, depend on a particular driver or hardware that may be employed in connection with the observation. The link quality may, in exemplary embodiments, be represented by an aggregate value.

According to further exemplary embodiments, the signal strength may be a received signal strength, and may be measured, for example, in arbitrary units or in dBm. The signal strength may be converted into its ultimate measurement by interpreting a raw value for the signal strength. For example, this may be done using the iwconfig wireless tool through the use of driver meta information that interprets a raw value. The iwconfig wireless tool is a linux tool, an exemplary explanation of which is provided by die.net at https://linux.die.net/man/8/iwconfig, however, other tools for configuring a wireless network interface such as are known or hereafter developed may be used. In embodiments, the driver meta information may interpret the raw value given by /proc/net/wireless, which displays a proper unit or maximum based thereon—for example, through a conversion using 8 bit arithmetic. Applicant notes that/proc/net/wireless is a linux information source, an exemplary explanation of which is provided by die.net at https://linux.die.net/man/8/iwconfig, however, any other suitable information source may be used. In exemplary embodiments, an Ad-Hoc mode may be employed in conjunction with the iwspy wireless tool in order to interpret the signal strength of the transceiver 103. The iwspy wireless tool is a linux tool, an exemplary explanation of which is provided by die.net at https://linux.die.net/man/8/iwspy, however, any suitable tool or application may be used.

After this current state data is obtained, at step S202 a reward is calculated, for example by the processor 102. The reward may, in exemplary embodiments, be calculated using a reward function.

The reward function may be constructed based for example on energy efficiency alone, or it may combine energy efficiency with other factors, such as a penalty of excessive changes in transmit power. In exemplary embodiments, such penalty for excessive changes in transmit power may result in the wireless network 100 tending towards greater constancy in total power consumption of its network system components. Advantageously, consideration of such penalty in the reward function may reduce extra processing burden associated with excessive change. The performance may be measured in terms of energy efficiency and throughput.

In certain exemplary embodiments, the reward may be based at least on a measure of energy efficiency. The measure of energy efficiency may, for example, be based on a throughput normalized by transmit energy consumption. The reward may further be adjusted based on, for example, a penalty associated with changing (and/or making large changes to) the transmit power.

This reward, in exemplary embodiments of the invention, may pertain specifically to a measure relating to energy efficiency at the time t1. Such measure may represent a balance between the throughput of the respective transceiver 103 and its energy consumption. In exemplary embodiments, the measure pertaining to energy efficiency may be based at least on one or both of (i) a throughput at the time t1 based at least on the respective link quality at the time t1 of the respective transceiver 103 and the respective signal strength at the time t1 associated with the respective transceiver 103, and (ii) an amount of energy consumption at the time t1 based at least on the respective transmit power level at the time t1 associated with the respective transceiver.

In exemplary embodiments, the calculation of the reward may be further based on a change between the respective transmit power level at the time t1 associated with the respective transceiver and the respective transmit power level at the time t0 associated with the respective transceiver, such that the reward decreases according to higher values of the change.

In exemplary embodiments, the reward may be calculated according to the equation $$r_n(t) = \frac{T_n(t)}{E_n(t)} - c \cdot \Delta P_n(t),$$

where $r_n(t)$ may be a reward associated with a node n at the time t, $P_n(t)$ may be a transmit power level of the node n at the time t, $T_n(t)$ may be a throughput received by the node n at the time t as determined based at least on a link quality associated with a transceiver of the node n and a signal strength associated with the transceiver of the node n, $E_n(t)$ may be the total energy consumption that corresponds to one time increment and is based at least on a transmit power of the node n, and c may be a positive constant. In exemplary embodiments, $E_n(t)$ may be normalized with respect to a packet duration.

After the calculation of the reward, at step S204, the current state data and the reward are stored. This storage may occur in a memory associated with the processor 102. The storage may occur in the form of a collected parameters database, for example in that memory. Additionally, an identification of the respective node may be stored, as may be previously obtained state data, from a time t0 previous to the time t1, including a respective transmit power level at the time t0 of the respective transceiver, a respective link quality at the time t0 associated with the respective transceiver, and a respective signal strength at the time t0 associated with the respective transceiver. With reference to FIG. 3, in exemplary embodiments of the present invention, for each node 101, the state s may include, for example, a transmit power, a link quality and a signal strength.

In another exemplary embodiment, at step S204, alternatively, a reward may be stored in a Q-table matrix, for example, in a memory associated with the respective processor 102. The reward may be stored in a location within the Q-table matrix based at least on one or more or all of (i) the current state data, (ii) an identification of the respective node, and (iii) previously obtained state data, from a time t0 previous to the time t1, comprising a respective transmit power level at the time t0 of the respective transceiver, a respective link quality at the time t0 associated with the respective transceiver, and a respective signal strength at the time t0 associated with the respective transceiver. Such Q-table matrix may, in an exemplary embodiment, be in the form shown in FIG. 5. As per the exemplary embodiment shown in FIG. 5, the location of rewards within the Q-table matrix, such as calculated rewards, may correspond both to particular states and to particular actions to be selected. In such exemplary embodiment, a state may be representative, for example, of multiple input features, such as, in an exemplary embodiment, the link quality, the signal strength, and a power level (such as the current power level). These features may together form a tuple that together corresponds to the state. In exemplary embodiments, the actions may include increasing the transmit power level of a respective transceiver 103, decreasing the transmit power level of a respective transceiver 103, or maintaining the transmit power level of a respective transceiver 103.

It will be understood that in certain exemplary embodiments that do employ a neural network, the neural network may take the form of a Deep Q-Network, which Deep Q-Network neural network may in turn effectively approximate a Q-table matrix, for example, the Q-table matrix described above.

In exemplary embodiments, the stored collected parameters data, as shown for example in FIG. 4, may serve as a way to parameterize the neural network in the memory associated with the respective processor 102 and thereby effect a particular action-determination policy. The collected parameters data may include, for example, a plurality of entries (shown in FIG. 4, for illustrative purposes, as data rows) containing one or more or all of the following:

A node ID or other identifier associated with a particular node 101 in the wireless network 100;

A timestamp which may be associated with an observation time;

Features relating to a relatively earlier observation time, which features may comprise transmit power, link quality, and signal strength (which items it will be understood may together make up or indicate a state s at a given time);

An indication of an action a selected by the deep reinforcement learning agent 301, using a neural network, based at least on those state-determinative features. By way of example, a 0 may correspond to an action of decreasing the transmit power of the respective transceiver 103, for example by a fixed amount such as 1 dBm, a 1 may correspond to maintaining the transmit power, and a 2 may corresponding to increasing the transmit power of the respective transceiver 103, for example by a fixed amount such as 1 dBm An indication of energy efficiency of the associated transceiver 103 in the network environment 300. It will be understood that the objectives of maximizing the network throughput and minimizing the energy consumption (that may be critical for edge devices operating on limited battery power) may be integrated into this indication, and that this indication may be used in the calculation of a reward;

Features relating to a relatively later time, after the earlier observation time, which features may again comprise transmit power, link quality, and signal strength;

An indication of whether necessary tasks have been performed; and

A P constant, which may also be used in the calculation in the reward, for example by determining a penalty associated with changes in transmit power.

It will be understood that fewer than all of these items may be included in exemplary embodiments of the invention (for example, the indication of whether necessary tasks have been performed may be omitted), and/or additional items, such as additional indications of network desirability which may be included, may be included.

At step S206, the current state data, and the collected parameters database, may be provided to a reinforced neural network. It will be understood that in exemplary embodiments, this reinforced neural network may be a deep neural network, a Deep Q-Network, or a feed forward neural network such as a multi-layer feed forward neural network. In exemplary embodiments, the multi-layer feed forward neural network may have an input layer, at least one hidden layer, and an output layer. The input, in exemplary embodiments, may take the current state data as an input, and the output layer may have a set of neurons corresponding to a set of possible actions. In further exemplary embodiments, at least one hidden layer may be configured to embody an activation function, for example, a rectifying linear unity (ReLU) activation function, a leaky rectifying linear unit (Leaky-ReLU) activation function, a hyperbolic tangent (Tanh) activation function, a sigmoid activation function, a logistic activation function, a scaled exponential linear units (SELU) activation function, a Gaussian error linear unit (GeLU) activation function, an exponential linear unit (ELU) activation function, a parametric rectified linear unit (PReLU) activation function, or a sigmoid linear unit (SiLU) activation function, to name a few.

In another exemplary embodiment, such as the exemplary embodiment discussed above in connection with step S204 and step S206 that discuss a Q-table matrix, instead the Q-table matrix and the current state data may be provided to a reinforcement learning engine.

At step S208, an action may be selected, using this reinforced neural network, from amongst a set of possible actions relating to the transmit power level of the respective transceiver, based at least on the current state data and the collected parameters database. According to exemplary embodiments of the invention, and as shown in FIG. 3, the neural network may be parameterized in such a way as to specifically and adjustably implement a policy that, taking a particular state s as an input, selects an action a. By way of example, the neural network may have parameterization that determines a path along the neural network ultimately leading between an input state s and an output action a. In exemplary embodiments, this path may be determined using weights or other parameters that determine a likelihood of a particular path choice along the network.

In an another exemplary embodiment, such as the exemplary embodiment discussed above in connection with steps S204 and S206 discussing a Q-table matrix, instead the action may be selected using a reinforcement learning engine, and this selection may be based at least on the current state data and the Q-table matrix.

At step S210, the selected action is output, such that the respective transmit power level of the respective transceiver 103 of the associated node 101 is selectively modified in accordance with the selected action. Accordingly, the respective transceiver 103 may have a higher or lower transmit power level, or in exemplary embodiments, may maintain its current transmit power level. The action a may adjust the transmit power of the respective transceiver 103. Accordingly, attributes of the wireless network 100, such as the transmit power level, the link quality, and the signal strength, particularly as they relate to the respective transceiver 103, may change, and these changes may be noticed when aspects of this method may be repeated and additional environmental observations relating to the transceiver 103 are taken.

In order to adjust the policy implemented by the neural network for action-determination, the collected parameters data may be used, (e.g. according to the example collected parameters data as shown in FIG. 4) and by the storage of such collected parameters data at step S204 and the providing of such data to the neural network at step S206, a policy for action-determination may thereby be created or updated that may be used for purposes of selecting an action at step S208. For example, to provide or update the collected parameters data, a reward, responsive to a particular action a being selected based on a state s, may be calculated, obtained and/or determined at step S202, for example by the respective processor 102, such as after receiving the link quality and signal strength data from respective transceiver 103 at step S200, which may be indicative of the desirability of the action in the network environment 300, which network environment 300 may be affected by a variety of factors including its topology, channel effects, and traffic effects.

Advantageously, exemplary embodiments of the present invention result in DRL effectively interacting with and learning from the network environment 300, and in effectively controlling the transmit power for communications such as WiFi communications. In exemplary embodiments, major improvement may be provided to energy efficiency and throughput, for example, compared to merely using fixed transmit across the transceivers in a system.

In exemplary embodiments, time intervals, between which observations may be made at S200, such as those pertaining to transmit power, signal strength and link quality may be measured and may be indexed with respect to the WiFi frame duration. At any given time interval, each node 101 may measure channel conditions such as link quality and signal strength at S200, and may selectively adjust its transmit power at S210. In exemplary embodiments, adjustments to transmit power at S210 may be limited to time periods when the respective transceiver 103 is actually transmitting communications. Advantageously, this may result in, over time, adapting to dynamics of network topology and channel as well as dynamics of the network protocol itself.

In exemplary embodiments, each node 101 may act as a source, a destination, or a relay for the network traffic, such as multi-hop network traffic.

In certain DRL implementations according to exemplary embodiments of the present invention, each node 101 may adjust, or separately adjust, its transmit power at any given time, for example when the corresponding processors 102 separately arrive at S210 in parallelly executed processes. As the network conditions change, DRL, for example, through provision of appropriate collected parameters data to a neural network at S206, may provide a mechanism to adapt to the network environment 300 (including, for example, network topology, channel effects, and/or traffic effects), thereby interacting with the environment (e.g. at S200), performing actions (e.g. at S210), and learning by a trial-and-error method (e.g. at S202 and S206). In exemplary embodiments, the deep reinforcement learning agent 301, which may be implemented on the processor 102, uses a neural network, such as a deep neural network to approximate a Q-function in Q-learning, seeking to maximize the expected discounted reward. In exemplary embodiments, a DQN may be used to approximate the Q value by training such a deep neural network. In exemplary embodiments, an algorithm for a Deep Q-learning approach may be implemented based on the following pseudocode:

---

Initialize reply memory M;
Initialize action-value function Q with random weights;
for episode=1, . . . ,M do
  for episode=1, . . . ,M do
    for each node i (in parallel) do
      1) Observes its state and a acquires states of other nodes from local
        messages to form observation vector $S_i(t)$.
      2) Selects action
        $a_i(t) = \arg\max_{a_i(t) \in A} Q(S_i(t), a_i(t))$
        w.p. $1 - \epsilon$ or a random action $a_i(t) \in A$ w.p. $\epsilon$.
      3) Performs an action $a_i(t)$
      4) Receives reward $r_i(s_i(t), a_i(t))$.
      5) Broadcasts its action to its neighbors.
      6) Stores transition in replay memory M.
      7) Updates weights
    end
  end
end

---

Formally, for example according to such an algorithmic approach according to exemplary embodiments of the present invention, Q-learning may be understood according to one or more or all of following features:

$r_t$ is the reward at time t, $\gamma \in [0, 1]$ is the discount factor, and the discounted reward is $R_t = r_t + \gamma r_{t+1} + \gamma^2 r_{t+2} + \ldots$ The Q-function constructs a policy $\pi$ such that $Q_\pi(s, a) = E[R_t | s_t = s, a_t = a]$, where $a_t$ and $s_t$ denote the action and the state respectively, at time t.

The optimal action-value function $Q^*(s, a) = \max_\pi Q_\pi(s, a)$ obeys the following Bellman equation:

$$Q^*(s, a) = E_{s'}[r + \gamma \max_{a'} Q^*(s', a') | s, a], \quad (1)$$

where s' denotes the next state and a' is the action that maximizes the $Q^*(s', a')$ expression.

For implementation of such an algorithm according to exemplary embodiments of the invention, the Deep-Q learning may use a deep neural network, which may be parameterized by $\theta$ to represent $Q(s, a; \theta)$. This may be iteratively optimized by maximizing $$E_{s,a,r,s'}[r | \gamma \max_{a'} Q(s', a'; \theta_i^-) - Q(s, a; \theta_i)], \quad (2)$$

where $\theta_i$ may be the value for neural network at iteration i and $\theta_i^-$ and represent the parameters of the target network that is frozen for a number of iterations while updating the value (e.g. online) network. In deciding which actions to take, in exemplary embodiments of the invention, a $\epsilon$-greedy policy may be used that selects the action that maximizes the Q-value with probability 1-$\epsilon$ and a random (or pseudorandom or otherwise determined) action with probability $\epsilon$. Advantageously, this approach may balance an exploration-exploitation tradeoff. The deep Q-network (DQN) agent, which may be the deep reinforcement learning agent 301, may store the experiences, e.g. (s, a, r, s'), for example in a replay memory. In turn, this replay memory may be used, for example in the form of collected parameters data, to train the deep neural network (which deep neural network may implement the relevant action-determination policy). This training may occur through sampling mini-batches of experiences, or may occur through other forms experience replay.

In exemplary embodiments of the present invention, for any node n at time t, one or more or all of state $s_n(t)$, action $a_n(t)$, and reward $r_n(t)$ may be defined as follows:

State $s_n(t)$: The state may correspond to the tuple of $\{P_n(t), L_n(t), S_n(t)\}$, where $P_n(t)$, $L_n(t)$, $S_n(t)$ are the transmit power level, the link quality and the signal strength, respectively, for node n at given time t. In exemplary embodiments, range limitations may be imposed on the elements of this tuple, and/or increment amounts may be fixed. For example, $P_n(t)$ may be set to take values from 0 dBm to 20 dBm, and may be set to be adjusted with 1 dBm increments, $L_n(t)$ may be set to take values from 0 to 70 and 1 increments may be used on the measurement thereof, and/or $S_n(t)$ may be set to take values from −110 dBm to −40 dBm and 1 dB increments may be used for the measurement thereof Action $a_n(t)$: The action of node n at any given time t may be changing the transmit power, for example by selecting $\Delta P_n(t) = P_n(t) - P_n(t-1)$, where $\Delta P_n(t) \in$, where $\Delta$ may represent the amount of an applicable increment that has been set. Accordingly, in exemplary embodiments, there may be three possible actions. However, it will be understood that other sets of possible actions may be used, by way of example, according to $\Delta P_n(t) \in \{\Delta, -\Delta\}$, or according to a larger space that allows for increasing or decreasing of the transmit power of the transceiver 103 in various differing amounts, by way of example only, $\Delta P_n(t) \in \{2\Delta, \Delta, 0, -\Delta, -2\Delta\}$ Reward $r_n(t)$: The reward of node n at time t may be computed as $$r_n(t) = \frac{T_n(t)}{E_n(t)} - c \cdot \Delta P_n(t), \tag{3}$$

where $T_n(t)/E_n(t)$ may be a measure of energy efficiency, for example with $T_n(t)$ being the throughput received by node n at time t, and $E_n(t)$ may be the total energy consumption, e.g. normalized with respect to a packet duration, such as a duration that corresponding to one time increment. In exemplary embodiments, this may form the entirety of reward calculation, or the $-c \cdot \Delta P_n(t)$ term may be considered as well, with c being a positive constant (for example, c=0.1). In exemplary embodiments, Mbps may be used as the unit for throughput, and Mbps/Joule may be used as the unit of energy efficiency. The second term in the reward $(-c \cdot \Delta P_n(t))$ corresponds to the penalty of changing the transmit power (it is needed to avoid excessive fluctuations in decision space), and accordingly it will be understood that, in exemplary embodiments, other penalties may be used instead of or in addition to this second term. In exemplary embodiments, when node n is not transmitting at time t, a reward $r_n(t)$ of 0 may be imposed.

Advantageously, such uses of a DRL approach have limited computational complexity and memory requirements.

In exemplary embodiments, for example to approximate a Q value in a deep Q-network, a deep neural network may be trained. The deep neural network may map the input states to the pairs of actions and Q-values. For that purpose, a feed forward neural network may be used. Such feed forward neural network may have, for example, three layers. The input layer may take the states as the input, and may have a number of neurons in such layer corresponding to the number of states. There may be one, two, or more hidden layers, which may have, for example, 140 and/or 70 neurons in the layers thereof. The output layer may have a set of neurons corresponding to the possible actions, for example three actions where the possible actions are the members of the set $\{\Delta, 0, -\Delta\}$. A rectifying linear unity (ReLU) activation function, or other activation function, for example those discussed herein, may be used for the hidden layers. The feedforward neural network may be trained by minimizing a loss function, for example the mean squared error (MSE) loss function such as the following:

$$\ell(\theta_i) = \left(rn(t) + \gamma \max_{a'} Q^*(s', a'; \theta_i^-) - Q(s, a, \theta_i)\right)^2 \tag{4}$$

Such loss function may, in exemplary embodiments, be used for the calculation of the reward at S202 in order that appropriate training of the neural network may occur at S206 and may be employed in the selection of actions at S206 which are outputted at S210.

In exemplary embodiments, the deep reinforcement learning agent 301 for certain or all of the nodes 101 may be trained by the help of other nodes 101 such as neighboring nodes, for example, through announcements made through direct or indirect communication channels between nodes 101. Such announcements may be used to create collected parameters data pertaining to other nodes, which may be indicated, as shown for example in FIG. 4, with different node identifications.

In an exemplary embodiment, a wireless network includes a plurality of nodes, each respective node including a respective transceiver having a respective transmit power level and configured to communicate, and a respective processor configured to: (1) obtain, as current state data, a time t1, the respective transmit power level at the time t1 of the respective transceiver, a respective link quality at the time t1 associated with the respective transceiver, and a respective signal strength at the time t1 associated with the respective transceiver, (2) calculate, as a reward, a measure pertaining to energy efficiency at the time t1 based at least on (i) a throughput at the time t1 based at least on the respective link quality at the time t1 of the respective transceiver and the respective signal strength at the time t1 associated with the respective transceiver, and (ii) an amount of energy consumption at the time t1 based at least on the respective transmit power level at the time t1 associated with the respective transceiver, (3) store, in a memory associated with the processor, in a collected parameters database: (i) the current state data, (ii) an identification of the respective node, (iii) the reward, and (iv) previously obtained state data, from a time t0 previous to the time t1, comprising a respective transmit power level at the time t0 of the respective transceiver, a respective link quality at the time t0 associated with the respective transceiver, and a respective signal strength at the time t0 associated with the respective transceiver, (4) provide the current state data, and data from the collected parameters database to a reinforced neural network, (5) select an action, using the reinforced neural network, from amongst a set of possible actions relating to the transmit power level of the respective transceiver, based at least on the current state data, and the data from the collected parameters database, and (6) output the selected action, such that the respective transmit power level of the respective transceiver of the associated node is selectively modified in accordance with the selected action.

In exemplary embodiments, the calculation of the reward may further be based on a change between the respective transmit power level at the time t1 associated with the respective transceiver and the respective transmit power level at the time t0 associated with the respective transceiver, such that the reward decreases as the change increases. The calculation of the reward, as applied at a time t, may be according to the equation $$r_n(t) = \frac{T_n(t)}{E_n(t)} - c \cdot \Delta P_n(t),$$

where $r_n(t)$ is a reward associated with a node n at the time t, $P_n(t)$ is a transmit power level of the node n at the time t, $T_n(t)$ is a throughput received by the node n at the time t as determined based at least on a link quality associated with a transceiver of the node n and a signal strength associated with the transceiver of the node n, $E_n(t)$ is the total energy consumption that corresponds to one time increment and is based at least on a transmit power of the node n, and c is a positive constant. $E_n(t)$ may be normalized with respect to a packet duration.

In exemplary embodiments, the respective transceiver of each respective node of the plurality of nodes may be configured to communicate with at least one other respective transceiver of at least one other respective node of the plurality of nodes. The respective transceiver of each respective node of the plurality of nodes may be configured to communicate with a central server.

In exemplary embodiments, the reinforced neural network may be a deep neural, or a multi-layer feed forward neural network. The multi-layer feed forward neural network may include an input layer, at least one hidden layer, and an output layer. The input layer may take the current state data as an input, and the output layer may have a set of neurons corresponding to the set of possible actions. The at least one hidden layer may be configured to embody an activation function. The activation function may be a rectifying linear unity (ReLU) activation function, a leaky rectifying linear unit (Leaky-ReLU) activation function, a hyperbolic tangent (Tanh) activation function, a sigmoid activation function, a logistic activation function, a scaled exponential linear units (SELU) activation function, a Gaussian error linear unit (GeLU) activation function, an exponential linear unit (ELU) activation function, a parametric rectified linear unit (PReLU) activation function, or a sigmoid linear unit (SiLU) activation function.

In exemplary embodiments, the multi-layer feed forward neural network may be further configured to be trained by minimizing a mean squared error loss function.

In exemplary embodiments, the respective processor of one or more or each respective node of the plurality of nodes may be further configured to implement a routing protocol for communications involving the respective transceiver. The respective processor of one or more or each respective node of the plurality of nodes may be configured to control a wireless adapter of the respective transceiver or wireless front-end of the respective transceiver.

In exemplary embodiments, the respective transceiver of one or more or each respective node of the plurality of nodes operates in at least one of a 900 MHz band, a 2.4 GHz band, a 5 GHz band, or a 6 GHz band.

In exemplary embodiments, the plurality of nodes may include two nodes or at least three nodes. The respective transceivers of one or more or all of the plurality of nodes may be configured to communicate amongst themselves in a multi-hop fashion, or may be configured to communicate amongst themselves directly.

In exemplary embodiments, the respective transceiver of one or more or each respective node of the plurality of nodes may be a WiFi transceiver. In exemplary embodiments, the respective transceiver of one or more or each respective node of the plurality of nodes may be a WiFi 6 transceiver, a WiFi 6E transceiver, a Wifi HaLow transceiver, a Bluetooth transceiver, a Bluetooth Low Energy transceiver, a ZigBee transceiver, a Z-Wave transceiver, or a Long Range Wide Area Network transceiver.

In exemplary embodiments, the respective transceiver of one or more or each respective node of the plurality of nodes may be configured to operate according to at least one of a 802.11n specification, a 802.11b specification, a 802.11g specification, a 802.11ac specification, a 802.11ah specification, a 802.11ax specification, a 802.11ax-2021 specification, a 802.15.4 specification, and a Long Range (LoRa) specification.

In exemplary embodiments, the link quality may be based on at least one of a level of contention, a level of interference, a bit error rate, a frame error rate, a timing synchronization, and a hardware metric. The link quality may be based on an indication of a Link Quality Indicator (LQI).

In exemplary embodiments, the signal strength may be measured in arbitrary units, or in dBm. The signal strength may be based on an indication of a Received Signal Strength Indicator (RSSI).

In exemplary embodiments, the respective processor may be configured to obtain the respective transmit power level at the time t1 of the respective transceiver, obtain the respective link quality at the time t1 associated with the respective transceiver, and obtain the respective signal strength at the time t1 associated with the respective transceiver, by executing one or more drivers stored in the memory associated with the respective processor.

In exemplary embodiments, the set of possible actions relating to the transmit power level of the respective transceiver includes raising the respective transmit power level of the respective transceiver, lowering the respective transmit power level of the respective transceiver, and maintaining the transmit power level of the respective transceiver. In other exemplary embodiments, the set of possible actions relating to the transmit power level of the respective transceiver may include setting the transmit power level of the respective transceiver to a particular set value from amongst a plurality of possible set values. The plurality of possible set values may be dBm amounts corresponding to the 21 integers between 0 and 20 inclusive.

In another exemplary embodiment, a wireless network includes a plurality of nodes, each respective node including a respective transceiver having a respective transmit power level and configured to communicate, and a respective processor configured to (1) obtain, as current state data, a time t1, the respective transmit power level at the time t1 of the respective transceiver, a respective link quality at the time t1 associated with the respective transceiver, and a respective signal strength at the time t1 associated with the respective transceiver, (2) calculate, as a reward, a measure pertaining to energy efficiency at the time t1 based at least on (i) a throughput at the time t1 based at least on the respective link quality at the time t1 of the respective transceiver and the respective signal strength at the time t1 associated with the respective transceiver, and (ii) an amount of energy consumption at the time t1 based at least on the respective transmit power level at the time t1 associated with the respective transceiver, (3) store the reward, in a Q-table matrix in memory associated with the processor, in a location within the Q-table matrix based at least on (i) the current state data, (ii) an identification of the respective node, and (iii) previously obtained state data, from a time t0 previous to the time t1, comprising a respective transmit power level at the time t0 of the respective transceiver, a respective link quality at the time t0 associated with the respective transceiver, and a respective signal strength at the time t0 associated with the respective transceiver, (4) provide the current state data, and data from the Q-table matrix to a reinforcement learning engine; (5) select an action, using the reinforcement learning engine, from amongst a set of possible actions relating to the transmit power level of the respective transceiver, based at least on the current state data and the data from the Q-table matrix, and (6) output the selected action, such that the respective transmit power level of the respective transceiver of the associated node is selectively modified in accordance with the selected action.

In an exemplary embodiment, a method for balancing energy efficiency and throughput in a wireless network having a plurality of nodes having a respective transceiver, includes steps of: (1) obtaining, as current state data, a time t1, a respective transmit power level at the time t1 of a respective transceiver of a node from amongst the plurality of nodes, a respective link quality at the time t1 associated with the respective transceiver, and a respective signal strength at the time t1 associated with the respective transceiver; (2) calculating, as a reward, a measure pertaining to energy efficiency at the time t1 based at least on (i) a throughput at the time t1 based at least on the respective link quality at the time t1 of the respective transceiver and the respective signal strength at the time t1 associated with the respective transceiver, and (ii) an amount of energy consumption at the time t1 based at least on the respective transmit power level at the time t1 associated with the respective transceiver; (3) storing in a collected parameters database: (i) the current state data, (ii) an identification of the respective node, (iii) the reward, and (iv) previously obtained state data, from a time t0 previous to the time t1, comprising a respective transmit power level at the time t0 of the respective transceiver, a respective link quality at the time t0 associated with the respective transceiver, and a respective signal strength at the time t0 associated with the respective transceiver; (4) providing the current state data, and the collected parameters database to a reinforced neural network; (5) selecting an action, using the reinforced neural network, from amongst a set of possible actions relating to the transmit power level of the respective transceiver, based at least on the current state data and data from the collected parameters database; and (6) outputting the selected action, such that the respective transmit power level of the respective transceiver of the associated node is selectively modified in accordance with the selected action.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A wireless network comprising a plurality of nodes, each respective node comprising:
   a respective transceiver having a respective transmit power level and configured to communicate, and
   a respective processor configured to:
      obtain, as current state data, a time t1, the respective transmit power level at the time t1 of the respective transceiver, a respective link quality at the time t1 associated with the respective transceiver, and a respective signal strength at the time t1 associated with the respective transceiver,
      calculate, as a reward, a measure pertaining to energy efficiency at the time t1 based at least on (i) a throughput at the time t1 based at least on the respective link quality at the time t1 of the respective transceiver and the respective signal strength at the time t1 associated with the respective transceiver, and (ii) an amount of energy consumption at the time t1 based at least on the respective transmit power level at the time t1 associated with the respective transceiver,
      store, in a memory associated with the processor, in a collected parameters database:
         (i) the current state data,
         (ii) an identification of the respective node,
         (iii) the reward, and
         (iv) previously obtained state data, from a time t0 previous to the time t1, comprising a respective transmit power level at the time t0 of the respective transceiver, a respective link quality at the time t0 associated with the respective transceiver, and a respective signal strength at the time t0 associated with the respective transceiver,
      provide the current state data and data from the collected parameters database to a reinforced neural network,
      select an action, using the reinforced neural network, from amongst a set of possible actions relating to the transmit power level of the respective transceiver, based at least on the current state data and the data from the collected parameters database, and
      output the selected action, such that the respective transmit power level of the respective transceiver of the associated node is selectively modified in accordance with the selected action.

2. The wireless network of claim 1, wherein the calculation of the reward is further based on a change between the respective transmit power level at the time t1 associated with the respective transceiver and the respective transmit power level at the time t0 associated with the respective transceiver, such that the reward decreases as the change increases.

3. The wireless network of claim 1, wherein the calculation of the reward, as applied at a time t, is according to the equation $$r_n(t) = \frac{T_n(t)}{E_n(t)} - c \cdot \Delta P_n(t),$$

wherein $r_n(t)$ is a reward associated with a node n at the time t, $P_n(t)$ is a transmit power level of the node n at the time t, $T_n(t)$ is a throughput received by the node n at the time t as determined based at least on a link quality associated with a transceiver of the node n and a signal strength associated with the transceiver of the node n, $E_n(t)$ is the total energy consumption that corresponds to one time increment and is based at least on a transmit power of the node n, and c is a positive constant.

4. The wireless network of claim 3, wherein $E_n(t)$ is normalized with respect to a packet duration.

5. The wireless network of claim 1, wherein the respective transceiver of each respective node of the plurality of nodes is configured to communicate with at least one other respective transceiver of at least one other respective node of the plurality of nodes.

6. The wireless network of claim 1, wherein the respective transceiver of each respective node of the plurality of nodes is configured to communicate with a central server.

7. The wireless network of claim 1, wherein the reinforced neural network is a deep neural network.

8. The wireless network of claim 1, wherein the reinforced neural network is a multi-layer feed forward neural network.

9. The wireless network of claim 8, wherein the multi-layer feed forward neural network comprises an input layer, at least one hidden layer, and an output layer.

10. The wireless network of claim 9, wherein the input layer takes the current state data as an input, and the output layer has a set of neurons corresponding to the set of possible actions.

11. The wireless network of claim 10, wherein the at least one hidden layer is configured to embody an activation function.

12. The wireless network of claim 11, wherein the activation function is a rectifying linear unity (ReLU) activation function, a leaky rectifying linear unit (Leaky-ReLU) activation function, a hyperbolic tangent (Tanh) activation function, a sigmoid activation function, a logistic activation function, a scaled exponential linear units (SELU) activation function, a Gaussian error linear unit (GeLU) activation function, an exponential linear unit (ELU) activation function, a parametric rectified linear unit (PReLU) activation function, or a sigmoid linear unit (SiLU) activation function.

13. The wireless network of claim 8, wherein the multi-layer feed forward neural network is further configured to be trained by minimizing a mean squared error loss function.

14. The wireless network of claim 1, wherein the respective processor of each respective node of the plurality of nodes is further configured to implement a routing protocol for communications involving the respective transceiver.

15. The wireless network of claim 1, wherein the respective processor of each respective node of the plurality of nodes is configured to control a wireless adapter of the respective transceiver or wireless front-end of the respective transceiver.

16. The wireless network of claim 1, wherein the respective transceiver of each respective node of the plurality of nodes operates in at least one of a 900 MHz band, a 2.4 GHz band, a 5 GHz band, or a 6 GHz band.

17. The wireless network of claim 1, wherein the plurality of nodes comprises two nodes.

18. The wireless network of claim 1, wherein the plurality of nodes comprises at least three nodes.

19. The wireless network of claim 18, wherein the respective transceivers of each of the plurality of nodes are configured to communicate amongst themselves in a multi-hop fashion.

20. The wireless network of claim 18, wherein the respective transceivers of each of the plurality of nodes are configured to communicate amongst themselves directly.

21. The wireless network of claim 1, wherein the respective transceiver of each respective node of the plurality of nodes is a WiFi transceiver.

22. The wireless network of claim 1, wherein the respective transceiver of each respective node of the plurality of nodes is a WiFi 6 transceiver, a WiFi 6E transceiver, a Wifi HaLow transceiver, a Bluetooth transceiver, a Bluetooth Low Energy transceiver, a ZigBee transceiver, a Z-Wave transceiver, or a Long Range Wide Area Network transceiver.

23. The wireless network of claim 1, wherein the respective transceiver of each respective node of the plurality of nodes is configured to operate according to at least one of a 802.11n specification, a 802.11b specification, a 802.11g specification, a 802.11ac specification, a 802.11ah specification, a 802.11ax specification, a 802.11ax-2021 specification, a 802.15.4 specification, and a Long Range (LoRa) specification.

24. The wireless network of claim 1, wherein the link quality is based on at least one of a level of contention, a level of interference, a bit error rate, a frame error rate, a timing synchronization, and a hardware metric.

25. The wireless network of claim 1, wherein the signal strength is based on an indication of a Received Signal Strength Indicator (RSSI).

26. The wireless network of claim 1, wherein the link quality is based on an indication of a Link Quality Indicator (LQI).

27. The wireless network of claim 25, wherein the signal strength is measured in arbitrary units.

28. The wireless network of claim 25, wherein the signal strength is measured in dBm.

29. The wireless network of claim 1, wherein the respective processor is configured to obtain the respective transmit power level at the time t1 of the respective transceiver, obtain the respective link quality at the time t1 associated with the respective transceiver, and obtain the respective signal strength at the time t1 associated with the respective transceiver, by executing one or more drivers stored in the memory associated with the respective processor.

30. The wireless network of claim 1, wherein the set of possible actions relating to the transmit power level of the respective transceiver comprises raising the respective transmit power level of the respective transceiver, lowering the respective transmit power level of the respective transceiver, and maintaining the transmit power level of the respective transceiver.

31. The wireless network of claim 1, wherein the set of possible actions relating to the transmit power level of the respective transceiver comprises setting the transmit power level of the respective transceiver to a particular set value from amongst a plurality of possible set values.

32. The wireless network of claim 31, wherein the plurality of possible set values are dBm amounts corresponding to 21 integers between 0 and 20 inclusive.

33. A method for balancing energy efficiency and throughput in a wireless network having a plurality of nodes having a respective transceiver, comprising the steps of:
    obtaining, as current state data, a time t1, a respective transmit power level at the time t1 of a respective transceiver of a node from amongst the plurality of nodes, a respective link quality at the time t1 associated with the respective transceiver, and a respective signal strength at the time t1 associated with the respective transceiver;
    calculating, as a reward, a measure pertaining to energy efficiency at the time t1 based at least on (i) a throughput at the time t1 based at least on the respective link quality at the time t1 of the respective transceiver and the respective signal strength at the time t1 associated with the respective transceiver, and (ii) an amount of energy consumption at the time t1 based at least on the respective transmit power level at the time t1 associated with the respective transceiver;
    storing in a collected parameters database:
        (i) the current state data,
        (ii) an identification of the respective node,
        (iii) the reward, and
        (iv) previously obtained state data, from a time t0 previous to the time t1, comprising a respective transmit power level at the time t0 of the respective transceiver, a respective link quality at the time t0 associated with the respective transceiver, and a respective signal strength at the time t0 associated with the respective transceiver;
    providing the current state data, and the collected parameters database to a reinforced neural network;
    selecting an action, using the reinforced neural network, from amongst a set of possible actions relating to the transmit power level of the respective transceiver, based at least on the current state data and data from the collected parameters database; and
    outputting the selected action, such that the respective transmit power level of the respective transceiver of the associated node is selectively modified in accordance with the selected action.

* * * * *